United States Patent
Pincemin et al.

(10) Patent No.: US 8,280,246 B2
(45) Date of Patent: Oct. 2, 2012

(54) MEASURING DIFFERENTIAL GROUP DELAY IN AN OPTICAL FIBER CONNECTION

(75) Inventors: Erwan Pincemin, Gommenec'h (FR);
Daniel Hui Bon Hoa, Lannion (FR);
Paulette Gavignet, Tregastel (FR);
Christian Dourthe, Lannion (FR)

(73) Assignee: France Telecom, Paris (FR)

( * ) Notice: Subject to any disclaimer, the term of this patent is extended or adjusted under 35 U.S.C. 154(b) by 481 days.

(21) Appl. No.: 12/626,080

(22) Filed: Nov. 25, 2009

(65) Prior Publication Data
US 2010/0135654 A1 Jun. 3, 2010

(30) Foreign Application Priority Data
Nov. 27, 2008 (FR) ..................................... 08 58068

(51) Int. Cl.
*H04B 10/08* (2006.01)
(52) U.S. Cl. ............ 398/25; 398/28; 398/188; 398/152; 398/184
(58) Field of Classification Search .............. 398/25–29, 398/188, 152, 184, 161, 147, 148, 158, 159, 398/65, 53
See application file for complete search history.

(56) References Cited

U.S. PATENT DOCUMENTS

| 6,459,830 | B1 * | 10/2002 | Pua et al. | 385/24 |
| 6,493,473 | B1 * | 12/2002 | Wooten | 385/11 |
| 6,654,103 | B2 * | 11/2003 | Yu et al. | 356/73.1 |
| 6,654,105 | B2 * | 11/2003 | Wang et al. | 356/73.1 |
| 6,889,011 | B1 * | 5/2005 | Fee et al. | 398/148 |
| 7,352,971 | B2 * | 4/2008 | Roberts et al. | 398/147 |
| 7,558,479 | B1 * | 7/2009 | Robinson | 398/28 |
| 7,697,123 | B2 * | 4/2010 | Hui Bon Hoa et al. | 356/73.1 |
| 7,715,717 | B2 * | 5/2010 | Weiershausen et al. | 398/65 |
| 7,817,924 | B2 * | 10/2010 | Gervais et al. | 398/188 |

(Continued)

FOREIGN PATENT DOCUMENTS
JP 2008-224231 9/2009
(Continued)

OTHER PUBLICATIONS
Wang, J. et al., Experiments of Polarization Mode Dispersion Compensation for a 10GBIT/S System, Optical Transmissino, Switching, and Subsystems, C. F. Lam et al., Ed., SPIE vol. 5281, Bellingham, WA, 2004, pp. 309-313.

*Primary Examiner* — Kenneth N Vanderpuye
*Assistant Examiner* — Hibret Woldekidan
(74) *Attorney, Agent, or Firm* — Loew Hauptman Ham & Berner, LLP

(57) ABSTRACT

The differential group delay is measured in an optical fiber connection for an optical signal undergoing a phase modulation BPSK or DPSK by a digital signal at a given rate. A polarization controller at an emerging end of the connection scans polarization states of the modulated optical signal. An emulator iteratively introduces an additional delay in the modulated optical signal emerging from the connection and combines the delayed modulated optical signal and the non delayed modulated optical signal which are both polarized along two orthogonal axes into a resulting optical signal. A polarization controller and a fixed polarizer select a polarization state in the resulting optical signal along one of bisecting lines of the orthogonal axes into a linearly polarized signal. An eye diagram or a spectrum of the polarized signal is acquired by a digital oscilloscope or an optical spectrum analyzer to determine the differential group delay.

15 Claims, 4 Drawing Sheets

U.S. PATENT DOCUMENTS

| | | | |
|---|---|---|---|
| 7,899,324 B2 * | 3/2011 | Anderson et al. | 398/25 |
| 2002/0075477 A1 * | 6/2002 | Yu et al. | 356/73.1 |
| 2002/0089718 A1 * | 7/2002 | Penninckx et al. | 359/122 |
| 2003/0117612 A1 * | 6/2003 | Wight et al. | 356/73.1 |
| 2005/0052638 A1 * | 3/2005 | Ozeki et al. | 356/73.1 |
| 2006/0285852 A1 * | 12/2006 | Xi et al. | 398/141 |
| 2007/0274732 A1 * | 11/2007 | D'Errico et al. | 398/202 |
| 2009/0066937 A1 | 3/2009 | Hui Bon Hoa et al. | |
| 2009/0214202 A1 * | 8/2009 | Akasaka et al. | 398/29 |
| 2010/0073667 A1 * | 3/2010 | Cyr et al. | 356/73.1 |
| 2011/0142440 A1 * | 6/2011 | Xia et al. | 398/16 |

FOREIGN PATENT DOCUMENTS

WO 2007074277 7/2007

* cited by examiner

MEASURING DIFFERENTIAL GROUP DELAY IN AN OPTICAL FIBER CONNECTION

RELATED APPLICATIONS

The present application is based on, and claims priority from, French Application Number 0858068, filed Nov. 27, 2008, the disclosure of which is hereby incorporated by reference herein in its entirety.

BACKGROUND OF THE INVENTION

1. Field of the Invention

The present invention relates to measuring differential group delay in an optical fiber connection.

The invention finds applications particularly in the fields of telecommunications and optical fiber metrology. In particular, it is used for qualifying an optical fiber connection for the recipe of high rate and long-range wavelength division multiplexing (WDM) optical transmission systems with binary phase shift key (BPSK) or differential phase shift key (DPSK) modulation.

2. Description of the Prior Art

In an optical fiber transmission system, the whole connection, including line fiber sections and chromatic dispersion compensation fiber sections, as well as various elements of the system, such as multiplexers, demultiplexers, amplifiers, and OADM (Optical Add Drop Multiplexer) canal insertion and extraction components, behaves like a birefringent medium that induces effects that are harmful for propagation of a polarized optical signal modulated by a digital signal and injected into the connection.

According to a simple model of propagation for a pulse I of the electrical field of a linearly polarized optical signal in an optical connection LO, shown on FIGS. 1A and 1B, the pulse I is broken down into a fast pulse IR and a slow pulse IL along fast AR and slow AL orthogonal polarization axes of the birefringent medium. The polarization state of the pulse I is associated with the inclination level of the pulse with respect to one of the polarization axes, more particularly the fast axis AR. For instance, for an inclination of 45°, the impulsion I power is equidistributed on both axes.

For ideal faultless propagation as shown on FIG. 1A, pulses IR and IL respectively associated with axes AR and AL at the emergence end of the optical connection LO are synchronous. However, as shown on FIG. 1B, as the optical connection is not perfect, the birefringence phenomenon results in an enlarged pulse IE being received at the emergence end of the connection resulting from the sum of pulses IR and IL respectively transmitted along the axes AR and AL. On one hand, the enlarged pulse IE depends on a variation of the different propagation times for the pulses IR and IL that is due to birefringence variations accumulated along the connection LO that induces a propagation delay T1 for the slow pulse IL compared to the fast pulse IR at the emergence end of the connection LO. On the other hand, the enlarged pulse IE depends on the distribution of the pulse I power between the polarization axes AR and AL, on the variation of the position of the polarization axes along the connection, on the optical signal wavelength of the pulse I and on the environment conditions for the connection LO. The delay T1, called a differential group delay DGD, must be kept within a tolerance range specified by a maximum delay $DGD_{max}$ that is determined as a function of the data rate, the coding, and the modulation format of the signal injected into the connection. This maximum delay must be less than the bit period 1/D, i.e., inversely proportional to the rate D in bit/s of the digital signal modulating the optical signal transmitted over the connection.

The differential group delay DGD is simultaneously variable over time and is a function of the optical signal wavelength. The differential group delay is an instantaneous magnitude which depends on numerous physical factors that can vary over time, such as temperature, and stresses locally applied to an optical fiber, etc. Knowing the instantaneous value of the differential group delay T1 of a connection is essential for determining the formula of WDM systems or to improve the quality of transmission.

The total dispersion of the modulated optical signal emerging from the transmission system through an optical fiber due to the polarization of the injected signal and to the birefringence of the system optical medium is characterized by a magnitude called polarization mode dispersion PMD. This magnitude corresponds to the average of the differential group delays DGD for all the polarization states and all the wavelengths of the signals transmitted through the connection over the duration of the polarization mode dispersion measurement.

Patent application WO 2007/074277 owned by applicants assignee, corresponding to patent application US 2009/0066937 A1, discloses an instantaneous measurement of the differential group delay T1 in an optical fiber connection with a direct modulation by pulses NRZ-OOK (Non-Return to Zero/On-Off Keying). The differential group delay is measured in a test channel of the connection corresponding to a specific wavelength of the optical signal without causing traffic rupture in the optical signals multiplexed to the other wavelengths in the connection channels.

A measuring system for measuring the differential group delay according to the above mentioned patent application comprises, at the entrance end to the connection, a transmitter for modulating an optical signal through the pulses of a binary test sequence having a given rate D in a test channel, and a first polarization controller suitable for scanning polarization states applied to the modulated signal. At the emergence end from the connection, the measuring system comprises a second polarization controller independent from the first controller, suitable for subjecting the modulated signal emerging from the connection to a scan through polarization states, a differential group delay emulator suitable for varying a variable additional differential group delay T2, and a digital oscilloscope suitable for determining the value T1+T2=1/D of the resulting modulated signal transmitted by the emulator. In the emulator, the polarized optical signal outgoing from the second polarization controller is separated by birefringence into a modulated optical signal delayed by T2 following the slow axis and a non-delayed modulated optical signal following the fast axis. At the output of the emulator, the delayed modulated optical signal and the non delayed modulated optical signal are combined in a resulting modulated signal applied to the digital oscilloscope. As the optical signal of the test channel directly undergoes modulation by the test sequence pulses, the resulting signal outgoing from the emulator has three levels. The maximum level in the resulting signal corresponds to the addition of two synchronous pulses of the signal delayed by T2 and the non delayed signal. The intermediate level of the resulting signal corresponds to the pulse either in the delayed signal or in the non delayed signal. By suitably tuning the polarization states of the controllers and by adjusting the delay inside the emulator, the delay T2 can be derived when the opening of the eye diagram in the resulting signal is maximum in the digital oscilloscope.

When the optical fiber connection is BPSK or DPSK phase modulated, the modulated optical signal propagating along the connection has constant amplitude. Between two consecutive binary periods of the signal, the phase shift of the optical signal is 0 or $\pi$ according to the information bit state to be transmitted. Because of the polarization mode dispersion in the connection, the slow and fast components of the resulting phase modulated signal outgoing from the emulator have at any time t the same phase 0 or $\pi$ or two opposite phases 0 and $\pi$. Since such slow and fast components are orthogonal, the total power of the resulting signal observed on the oscilloscope is thus constant. In the absence of amplitude modulation (including by pulses) of the signal intensity, an eye diagram of the resulting signal with plural amplitude levels can not be directly produced at the output of the emulator by the digital oscilloscope.

SUMMARY OF THE INVENTION

The present invention overcomes the above mentioned disadvantages by measuring differential group delay in an optical fiber connection conveying an optical signal modulated by a digital signal at a given rate, by rotating the polarization state of the modulated optical signal emerging from the connection to provide a non delayed modulated optical signal, introducing an additional delay into the non delayed modulated optical signal to provide a delayed modulated optical signal, combining the delayed modulated optical signal and the non delayed modulated optical signal both polarized along two orthogonal axes into a resulting optical signal, and determining the differential group delay in the optical connection equal to the difference between the given rate inverse and the additional delay. To obtain the measurement:

the optical signal is phase modulated by the digital signal at the entrance end of the connection, the polarization state in the resulting signal is selected along substantially one of the bisecting lines of the orthogonal axes into a linearly polarized signal, and the differential group delay is determined as a function of a characteristic of the polarized signal.

Thanks to the selection of the polarization state in the resulting signal following substantially one of the bisecting lines of the orthogonal axes, the delayed modulated optical signal and the non delayed modulated optical signal interfere at the output of the polarizer and create an intensity modulated optical signal with two-level recognizable by an oscilloscope when the relationship T1+T2=1/D is met.

The polarization state selection can be performed either by a rotation of an orientable polarizer for substantially aligning the polarization axis of the orientable polarizer with one of the bisecting lines of the angle formed by the two orthogonal axes of a differential group delay emulator, or by a rotation of the polarization state of the resulting signal to cause half delayed modulated optical signal power corresponding to a slow component and of the non delayed modulated optical signal corresponding to a fast component to pass into a fixed optical polarizer.

The differential group delay measuring according to the preferred embodiment of the invention advantageously provides the instantaneous value of the total differential group delay DGD of the optical fiber connection at a given wavelength. Automation of measuring the differential group delay according to the preferred embodiment of the invention gives more precision to the measurement of the delay DGS while providing a measuring velocity compatible with the variation of the delay DGD, depending for example on temperature variations and stresses applied to the connection.

The differential group delay can be automatically measured according to two embodiments that can be combined.

When the characteristic of the polarized optical signal emerging from the orientable optical polarizer or from the above mentioned fixed polarizer is an eye diagram, determining the differential group delay can includes:

acquiring a two-level eye diagram of the polarized signal corresponding to the polarization states and to the additional delay introduced into the modulated optical signal, maximizing a number of points included in a collecting area of the eye diagram by rotating at least the polarization state of the modulated optical signal emerging from the connection, associating the additional delay with the maximized number of points, incrementing the additional delay and reiterating the previous steps until the number of points reaches at least a maximum number, and if the maximum number is reached, determining the differential group delay of the optical connection equal to the difference between the given rate inverse and the additional delay associated with the maximum number.

When the characteristic of the polarized optical signal emerging from the orientable optical polarizer or the above mentioned fixed polarizer is a frequency spectrum, determining the differential group delay can include:

acquiring a spectrum of the polarized signal corresponding to the polarization states and to the additional delay introduced into the modulated optical signal, maximizing the amplitude of spectral absorption lines located at the sum and at the difference between the frequency of the optical signal and an multiple integer of half the given rate by the rotation of at least the polarization state of the modulated optical signal emerging from the connection, said sum and difference possibly being frequencies delimiting a central lobe having a spectral width D if the multiple integer is equal to 1, or two secondary lobes if the multiple integer is different from 1, from the spectrum of the polarized signal of duo-binary type emerging from the polarizer and obtained by summing the non delayed modulated optical signal and the delayed modulated optical signal of one bit time 1/D equal to the sum of the differential group delay of the connection and the additional delay generated by the emulator, associating the additional delay with the maximized spectral absorption lines and thus to the characteristic spectrum of the duo-binary signal, incrementing the additional delay and reiterating the previous steps until the spectral absorption lines have reached maximal amplitudes and thus until the spectrum is the one of the duo-binary signal, and if the maximum amplitudes are reached and thus if the acquired spectrum is that of the duo-binary signal, determining the differential group delay of the optical connection equal to the difference between the given rate inverse 1/D and the additional delay associated with the maximal amplitudes.

The connection can be a section of an optic fiber connection, for instance between an input and an element of the connection such as a multiplexer, a demultiplexer, an amplifier and a channel insertion and extraction component.

According to a characteristic of the preferred embodiment of the invention, the differential group delay is more precisely measured for the whole optical fiber connection if a rotation of the polarization state of the modulated optical signal is provided at the entrance end of the optical connection. This characteristic allows maximum power to be injected at the entrance end of the connection depending on the orientation of the birefringence axes thereof.

The method according to the preferred embodiment of the invention is further used to estimate a polarization mode dispersion by averaging plural differential group delays determined over a predefined period at different wavelengths.

An object of an aspect of the invention is to provide a system for measuring differential group delay of an optical fiber connection conveying a BPSK or DPSK type modulated output signal at a given rate, including means for rotating the polarization state of the modulated optical signal emerging from the connection to provide a non delayed modulated optical signal, means for introducing an additional delay into the non delayed modulated optical signal to provide a delayed modulated optical signal, means for combining the delayed modulated optical signal and the non delayed modulated optical signal both polarized along two orthogonal axes into a resulting optical signal, and means for determining the differential group delay in the optical connection equal to the difference between the given rate inverse and the additional delay. The combining means can be a differential group delay emulator having fast and slow orthogonal axes along which the modulated optical signal emerging from the connection is divided into two components, one of the components undergoing the additional delay. The rotating means is used to orientate the polarization state of the modulated optical signal emerging from the connection and having undergone a differential group delay in the connection in order to align the orthogonal axes of the emulator substantially at 45°.

The measuring system includes:

means at the entrance end of the connection for phase modulating the optical signal by the digital signal, and means for selecting the polarization state in the resulting signal along substantially one of the bisecting lines of the orthogonal axes into a linearly polarized signal, the determining means being adapted to determine the differential group delay as a function of a characteristic of the polarized signal.

The measuring system embodying the preferred embodiment of the invention is advantageously non-intrusive and does not cause interruption of traffic on all the optical channels of the connection.

The selecting means can be include:

a fixed polarizer and means for rotating the polarization state of the delayed signal outgoing from the additional delay introducing means and of the non delayed signal to cause substantially half power of each of the orthogonal polarization states of the resulting signal, i.e. half power of the delayed modulated optical signal that corresponds to a slow component of the resulting signal, and half power of the non delayed modulated optical signal that corresponds to the fast component of the resulting signal, to pass through the fixed polarizer, or an orientable polarizer adapted to rotate for aligning its polarization axis with one of the bisecting lines of the angle formed by the two orthogonal axes of the means for combining the delayed modulated optical signal and the non delayed modulated optical signal.

In accordance with the characteristic of the polarized signal, the determining means can include a digital oscilloscope for acquiring an eye diagram of the polarized signal, or an optical spectrum analyzer for acquiring a spectrum of the polarized signal.

When the optical fiber connection carries a wavelength division multiplexed (WDM) signal, the measuring system can include a tunable filter for selecting a wavelength in the connection. The tunable filter can be connected through an optical amplifier to a monitoring port for any element of the optical connection. For instance, this element can be an optical amplifier, a demultiplexer or a channel insertion and extraction component. The system thus measures the differential group delay on the connection section extending between the connection input and this element, without disturbing the signals of all the channels supported by all the multiplexed wavelengths.

The measuring system can further include means at the entrance end of the connection for rotating the polarization state of the modulated optical signal.

An aspect of the invention also relates to a digital oscilloscope and an optical spectrum analyzer that can run simultaneously in a system for measuring the differential group delay of an optical fiber connection conveying a BPSK or DPSK optical signal modulated by a digital signal at a given rate.

The oscilloscope includes:

means for acquiring a two-level eye diagram of a linearly polarized signal of the duo-binary signal type as above defined, provided from a selection of polarization state in a signal resulting from a combination of the phase modulated optical signal delayed by an additional delay and the non delayed modulated optical signal. The delayed and non-delayed signals are both polarized along two orthogonal axes at the emerging end from the connection, the resulting signal being polarized along substantially one of the bisecting lines of the orthogonal axes, means for determining a maximum number of points included in a collecting area of the eye diagram during a rotation at least of the polarization state of the modulated optical signal emerging from the connection, and means for associating the additional delay with the determined maximum number of points.

The optical spectrum analyzer includes:

means for acquiring an optical spectrum of a linearly polarized signal of the duo-binary signal type, such as above defined, provided from a selection of polarization states in a signal resulting from a combination of the phase modulated optical signal delayed by an additional delay and the non delayed modulated optical signal. The delayed and non-delayed signals are both polarized along two orthogonal axes at the emerging end from the connection, the resulting signal being polarized along substantially one of the bisecting lines of the orthogonal axes, means for determining maximal spectral absorption lines located at the sum and at the difference between the frequency of the optical signal and multiple integer of half the given rate by a rotation of at least the polarization state of the modulated optical signal emerging from the connection, and means for associating the additional delay with the maximal spectral absorption lines that can correspond to those delimiting a central lobe of a spectral width D of the linearly polarized signal when the multiple integer is equal to 1, or to those delimiting two secondary lobes of a spectral width D/2 located on either side of the central lobe, characteristic of a duo-binary signal when the multiple integer is different from 1.

Finally, an aspect of the invention relates to a computer program adapted to be implemented in a processor, said program comprising instructions which, when the program is executed in the processor, performs the steps according to the method.

BRIEF DESCRIPTION OF THE DRAWINGS

Other characteristics and advantages of the present invention will become more clearly apparent from reading the following description of several embodiments of the invention, given by way of nonlimiting examples, with reference to the corresponding appended drawings in which.

Previously discussed

DESCRIPTION OF THE EMBODIMENTS

Figure 2:
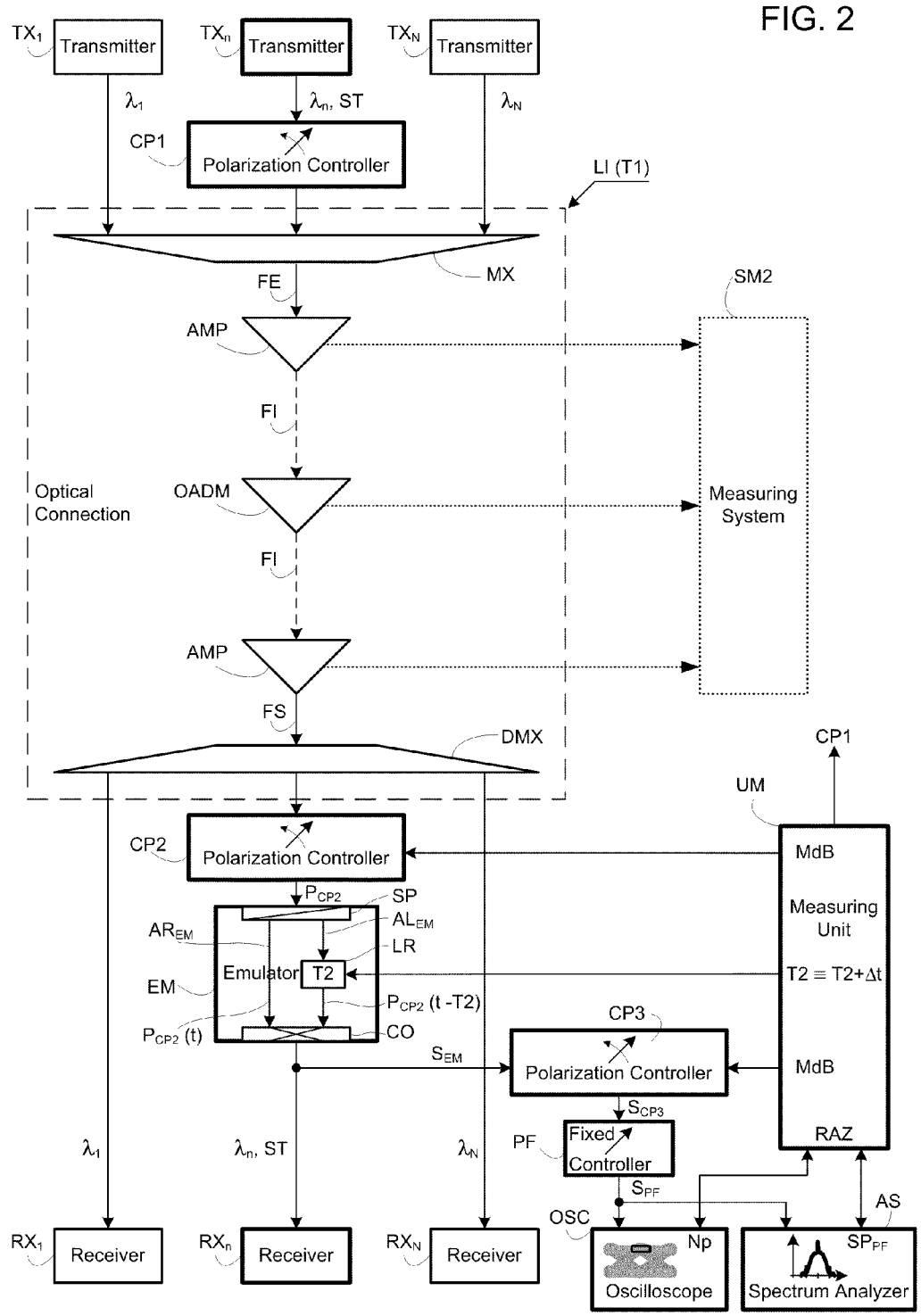
FIG. 2 is a schematic block diagram of a differential group delay measuring system according to a first embodiment shown in solid line, and according to a second embodiment shown in dotted line.

Referring to FIG. 2, the measuring system is used for measuring a differential group delay T1 in an optical fiber connection LI of wavelength division multiplexing type WDM and transmitting several optical signals respectively from transmitters $TX_1$ to $TX_N$, also called as transponders, to respective receivers $RX_1$ to $RX_N$. Signals with different wavelengths outgoing from the transmitters have undergone a phase shift keying modulation BPSK or DPSK with two phase states. The modulated signals are injected into the connection LI by input ports of a multiplexer MX to be multiplexed therein. The connection LI is for instance composed of a first optical fiber FE transmitting the multiplexed modulated signals, then intermediate optical fibers FI and a last optical fiber FS linked to the input port of a demultiplexer DMX. The optical fibers FE, FI and FS are interconnected by optical amplifiers AMP and one or more channel insertion and extraction components OADM marking out the connection.

According to a first embodiment of the invention shown in solid lines at FIG. 2, the measuring system comprises three polarization controllers CP1, CP2 and CP3, a differential group delay emulator EM, a fixed polarizer PF, a sampling digital oscilloscope OSC and a measuring unit UM.

The system units CP1, CP2, CP3, EM, PF, OSC and UM are illustrated as functional blocks, most of which provide functions linked to the invention and can comprise software and/or hardware modules.

The differential group delay is measured in a connection channel, called as a test channel, the optical signal of which has a specific wavelength $\lambda_n$, with $1 \leq n \leq N$. The optical signal is phase modulated by a digital signal constituted by a digital test sequence in one $TX_n$ of the transmitters $TX_1$ to $TX_N$ tuned to the wavelength $\lambda_n$. The traffic in the other channels having optical signals at the other multiplexed wavelengths $\lambda_1$ to $\lambda_n$ of the optical connection LI is not interrupted by the test sequence. The output of the transmitter $TX_n$ is connected to an input port of the multiplexer MX through the polarization controller CP1 at the entrance end of the optical connection LI. The test sequence may have a rate D of the order of 10 to 40 Gbits/s corresponding to a bit period of T=1/D of 25 to 100 ps and be coded, for instance in non-return to zero NRZ binary and thus be modulated according to a two-state phase NRZ-BPSK or NRZ-DPSK phase modulation. A binary transmission error rate is measured at the emergence end of the connection LI, upstream the receiver $RX_n$ corresponding to the transmitter $TX_n$ of the test channel.

A output port of the demultiplexer DMX is connected to the receiver $RX_n$ over successively the polarization controller CP2 and the emulator EM. The output of the emulator EM is also linked to the oscilloscope OSC over successively the polarization controller CP3 and the fixed polarizer PF.

The first polarization controller CP1 is adapted to be controlled by the measuring unit UM to automatically rotate the polarization state of the phase modulated polarized optical signal $\lambda_n$ transmitted by the transmitter $TX_n$ in the test channel till selecting a polarization state of the test channel optical signal entering the optical connection LI being aligned to the bisecting line at 45° from the fast and slow polarization axes AR and AL at the entrance end of the connection. The entering signal power is thus equidistributed into fast and slow orthogonal components on the fast and slow axes AR and AL at the entrance end of the connection LI, the position of which is a priori unknown.

Since the polarization state of the optical signal propagating in the optical connection LI varies along this latter due to its birefringence, the polarization state of the test channel optical signal $\lambda_n$ emerging from the connection through the demultiplexer DMX is a priori unknown and distinct from the polarization state at the entrance end of the connection. The second polarization controller CP2 is adapted to be controlled by the measuring unit UM to automatically rotate the polarization state of the polarized optical signal of the test channel emerging from the connection through the demultiplexer until selecting a polarization state of the signal $P_{CP2}$ outgoing from the controller CP2 that is aligned with the bisecting line at 45° from the slow and fast orthogonal polarization axes $AL_{EM}$ and $AR_{EM}$ of a light beam birefringent separator SP at the input of the emulator EM. This alignment equidistributes the power of the signal $P_{CP2}$ applied to the emulator EM into fast and slow orthogonal components.

The emulator EM comprises for instance at the input the light beam birefringent separator SP, an optical line LR with an adjustable delay T2 linked to the output corresponding to the slow polarization axis $AL_{EM}$ of the separator, and at the output to a polarization holding optical coupler 50/50 CO having inputs respectively linked to the output of the delay line and directly to the output corresponding to the fast polarization axis $AR_{EM}$ in the input separator. The separator SP equally divides in power the signal $P_{CP2}$, linearly polarized at 45° from its orthogonal axes, outgoing from the controller CP2 into fast and slow orthogonal components. The coupler CO equally combines in power the slow component $P_{CP2}$(t–T2) delayed by T2 and the non delayed fast component $P_{CP2}$(t) into a resulting signal $S_{EM}$ applied to the third polarization controller CP3 and to the receiver $RX_n$. The delay T2 added to the delay T1 produced by the propagation along the slow axis of the optical connection LI, overlooking the delay introduced by the separator, is introduced in a motorized way by the delay line on the test channel slow component emerging from the optical connection LI so that the equality T1+T2=1/D is met. Since the rate D is that of the test sequence and known by the measuring system as the fixed rate of the transmitters of the connection LI with wavelength division multiplexing WDM, the delay $T1=1/D-T2$ is derived therefrom.

Figure 4:
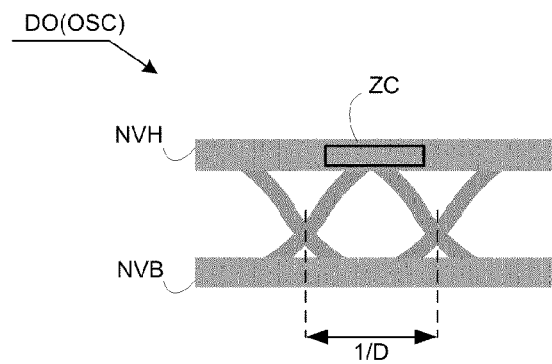
FIG. 4 is an eye diagram displayed on an oscilloscope and resulting from the differential group delay measuring method of a preferred embodiment of the invention.

Considering the preceding conditions, if the output of the emulator EM is directly linked to the oscilloscope OSC and the optical signal with the wavelength $\lambda_n$ of the test channel is modulated by NRZ-OOK pulses, the resulting signal measured with the oscilloscope outgoing from the emulator shows three amplitude levels, as shown on FIG. 4 of patent application WO 2007/074277. The outgoing signal has a low level for low states "0" of the delayed slow component and the fast component, an intermediate level for the low state of one of the components and a high state for the other component, and a high level for high states of both components. A maximum of contrast of the intermediate level and a maximum opening between the low and high levels of the eye diagram can thus be observed on the oscilloscope.

Figure 1A:
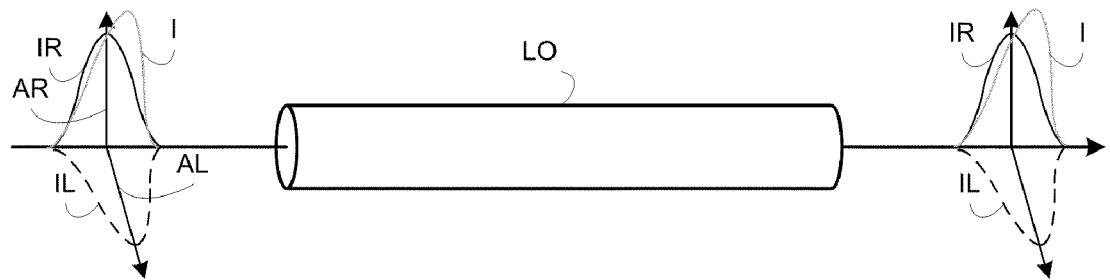
FIGS. 1A and 1B are illustrations of schemes representative of the propagation of an optical signal pulse of OOK type in an optical connection respectively without and with transmission faults due to the birefringence of the connection.
Figure 1B:
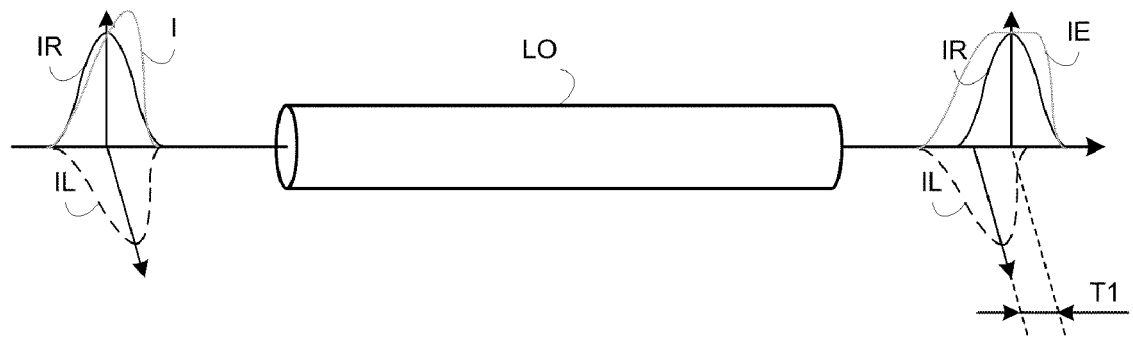
Figure 3:
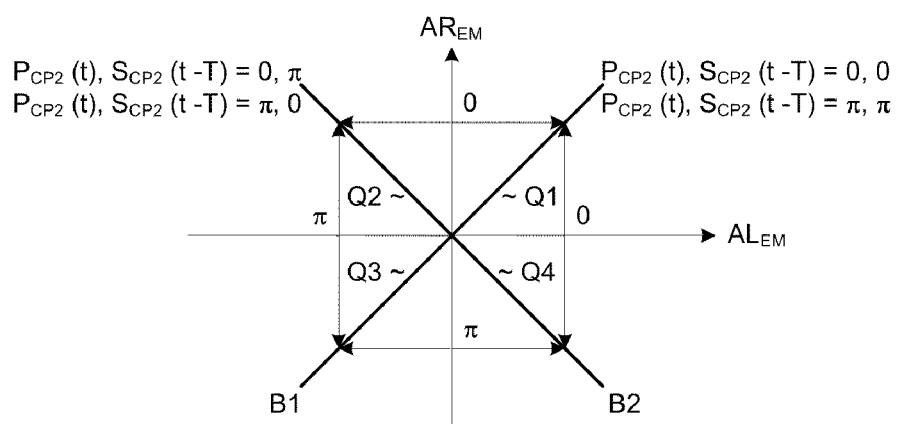
FIG. 3 is a diagram including orthogonal polarization axes of a differential group delay emulator in the measuring system according to a preferred embodiment of the invention and two possible positions of an optical polarizer oriented substantially at 45° of the orthogonal axes.

In contrast, when the signal with the wavelength $\lambda_n$ of the test channel is, according to the invention, phase modulated BPSK or DPSK with two phase states by the test sequence, the resulting signal $S_{EM}$ outgoing from the emulator EM has an envelope having a constant amplitude corresponding to the high level of the pulse modulated resulting signal outgoing from the emulator according to the patent application WO 2007/074277. Since due to the polarization mode dispersion at the emergence end of the connection LI, the signal $S_{EM}$ results from the combination of two components of the same intensity on the slow and fast orthogonal polarization axes $AL_{EM}$ and $AR_{EM}$ of the separator SE, after having introduced a total delay of a bit period $T=T1+T2$, the resulting signal $S_{EM}$ is modulated along two polarization axes that are defined by bisecting lines B1 and B2 of the polarization axes $AL_{EM}$ and $AR_{EM}$, as shown on FIG. 3. When two bits having the same phase 0 or $\pi$ are consecutive in the modulated signal $P_{CP2}$ and simultaneous respectively in the delayed signal $P_{CP2}(t-T2)$ on the slow axis and the non delayed signal $P_{CP2}(t)$ on the fast axis, they add in the signal $S_{EM}$ that is then linearly polarized at 45° from the fast axis $AR_{EM}$ along the bisecting line B1 in the first and third quadrants Q1 and Q3 of the reference system with the slow and fast polarization axes $AL_{EM}$ and $AR_{EM}$ of the separator SP. When two bits having opposite phases 0 and $\pi$, or $\pi$ and 0, are consecutive in the signal $P_{CP2}$ and simultaneous respectively in the delayed signal $P_{CP2}(t-T2)$ and the non delayed signal $P_{CP2}(t)$, they add in the signal $S_{EM}$ which is then linearly polarized at 135° from the fast axis $AR_{EM}$ along the bisecting line B2 of the second and fourth quadrants Q2 and Q4 of the slow and fast polarization axes $AL_{EM}$ and $AR_{EM}$ of the separator SP. The total power of the phase modulation resulting signal $S_{EM}$ is thus constant independently from the signal phases in the test channel and no workable eye diagram with plural levels of the signal $S_{EM}$ can be directly produced by the oscilloscope.

The phase modulation resulting signal $S_{EM}$ outgoing from the emulator has two orthogonal polarization states along the bisecting lines B1 and B2 respectively if the signal $P_{CP2}$ includes two consecutive bits having the same phase and if the signal $P_{CP2}$ includes two consecutive bits having opposite phases. The phase modulation of the BPSK or DPSK signal has been transformed into a polarization modulation by the differential group delay conferred by the emulator. The fixed polarizer PF is adapted to select one of such polarization states in order to produce a linearly polarized signal $S_{PF}$ comprising pulses corresponding to two consecutive bits in the BPSK or DPSK signal having the same phase if the polarization state is selected along the first bisecting line B1, or having opposite phases if the polarization state is selected along the second bisecting line B2. The third polarization controller CP3 interconnected between the output of emulator EM and the input of fixed polarizer PF is controlled by the measuring unit in order to select an orientation of the polarization state of the resulting signal $S_{EM}$ so that half power of each of the orthogonal polarization states of the signal $S_{EM}$ corresponding in the emulator to the delayed modulated optical signal constituting the slow component and to the non delayed modulated optical signal constituting the fast component crosses the fixed polarizer PF. The "pulse" polarized signal $S_{PF}$ applied by the fixed polarizer to the oscilloscope OSC is shown as a binary signal having two levels, namely a high level NVH corresponding to two consecutive bits in the test sequence having the same phase for the selected polarization state B1, or having opposite phases for the selected polarization state B2, and a low level NVB for the non selected polarization state, as shown on FIG. 4. The signal $S_{PF}$, the intensity of which is modulated, is detectable by the photodiode of the optical head in the oscilloscope and digitalized by an analog-to-digital converter in the oscilloscope OSC. The oscilloscope recovers the signal frequency $\lambda_n$ of the test channel in the detected polarized signal $S_{PF}$ in order to synchronize the sampling of the signal $S_{PF}$ pulses transmitted by the fixed polarizer PF and the horizontal scan on the screen of the oscilloscope. The oscilloscope records the signal $S_{PF}$ pulses and reproduces in a time window the superposition of all the pulses to construct and display an eye diagram DO with two levels. The eye diagram DO, as illustrated on FIG. 4, results from sample juxtaposition in a predefined time window, preferably wider than the double period $2T=2/D$ of the pulses in the detected signal $S_{PF}$.

The measurement of the differential group delay T1 relies on the examination of the evolution of the eye diagram DO recorded upon variations of the polarization states produced by the three polarization controllers CP1, CP2 and CP3 and of the delay T2 in the emulator EM in order to explore all the possible configurations of the polarization states of the three controllers until the displaying of an eye diagram having two distinct levels showing the larger opening for a delay value T2 fixed in the emulator. The equality $T1+T2=1/D$ is performed when the eye opening in the diagram DO displayed by the oscilloscope reaches a maximum. Assuming that the polarization states are suitably adjusted in the polarization controllers, a delay variation T2 in absolute value from the zero value in the emulator progressively shows a more and more open eye diagram DO.

The maximum opening of the eye diagram DO can be automatically detected by computing the number Np of pixels in a collecting area ZC located on one of the levels of the eye diagram. For instance, the area ZC is pre-programmed in the oscilloscope by a technician and is located on the high level NVH of the eye diagram DO, as shown in FIG. 4. The points are accumulated during an acquisition time of the eye diagram until reaching a maximum opening of the eye.

The measuring unit UM controls the polarization controllers CP1, CP2 and CP3, the emulator EM and the oscilloscope OSC of the measuring system. The unit UM controls the scrambling mode of the controllers, varies the additional delay value T2 by incrementation, transmits the incremented delay to the emulator EM and controls a return to zero RAZ of the number of points Np in the oscilloscope OSC at the beginning of each acquisition of the eye diagram DO. For determining the differential group delay T1, the measuring unit UM establishes the plotting of an increasing monotonous curve corresponding to the number of points Np included in the collecting area ZC transmitted by the oscilloscope OSC as a function of the additional delay T2, the value of which varies progressively from zero to at most a value substantially equal to T=1/D. The more the cumulated delay T1+T2 increases toward the bit period, the more the pulses in the signal $S_{PF}$ are distinct. A first maximum of the number of points Np detected by the unit UM corresponds to the additional delay T2 for which T1+T2=1/D.

Alternatively, the oscilloscope OSC is included into the measuring unit UM.

The alignments that are looked for at 45° of the polarization states of the controllers CP1 and CP2 respectively with the bisecting lines of the slow and fast axes at the entrance end of the connection LI and in front of the separator SP of the emulator EM are not critical and can tolerate gaps of about ±15°. It is the same for the selection of the resulting signal $S_{EM}$ polarization state substantially along the bisecting lines B1 and B2 across the fixed polarizer PF by the controller CP3.

Figure 5:
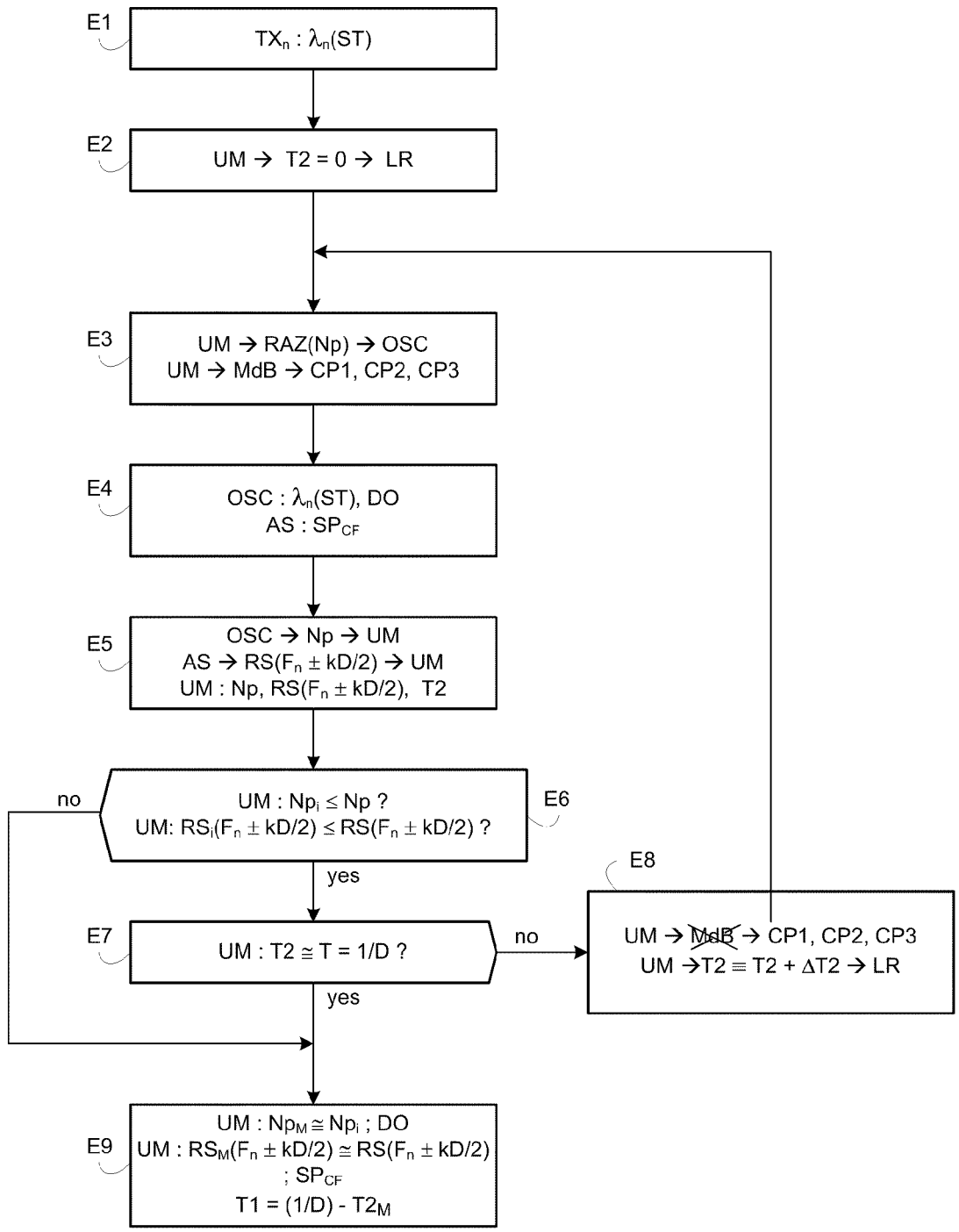
FIG. 5 is flow diagram of the differential group delay measuring method according to a preferred embodiment of the invention.

The method for measuring the differential group delay of an optical connection comprises steps E1 to E9 shown in FIG. 5.

At step E1, the transmitter $TX_n$ is activated to transmit a signal of a wavelength $\lambda_n$ phase modulated to the BPSK or DPSK format with two phase states by the digital test sequence ST.

At step E2, the measuring unit UM resets the additional delay T2 of the variable delay line LR in the emulator EM.

The steps E3 to E8 are iterative for successive values of the additional delay T2.

At step E3, the measuring unit UM transmits a controls of resetting RAZ of the number of points Np in a counting module included in the oscilloscope OSC, remote controls the activation in scrambling mode MdB of the first controller CP1 at the entrance end of the connection LI and controls in scrambling mode MdB the second and third controllers CP2 and CP3 at the emergence end of the connection LI. As the orientations of the main polarization axes of the connection, the emulator and the fixed polarizer are unknown and are further modified in the time and depend on the wavelength, the rotations of the controller polarization axes in scrambling mode are independently controlled one from each other in order to explore all the possible configurations of the input and output polarization states of the connection and the emulator and thus select the polarization state of the resulting signal $S_{EM}$ allowing for half of its power to be arranged following along one of the bisecting lines B1 and B2 of the orthogonal axes in the separator SP.

At step E4, the oscilloscope OSC continuously displays an eye diagram DO evolving according to the polarization state variation of the controllers. In the oscilloscope, the photodiode detects the polarized signal $S_{PF}$ outgoing from the fixed polarizer PF and a time basis recovers the test sequence frequency in order to synchronize the sampling of the received test sequence ST and the horizontal scan on the oscilloscope screen. The acquisition and displaying period for the whole eye diagram DO is more than the scan period of the polarization states applied by the controllers CP1, CP2 and CP3 on the test sequence so that all the polarization states corresponding to orientations of the polarization axes by 45° from the input and the output of the connection and the emulator EM are shown on the diagram. After the stable acquisition of the eye diagram DO with two levels NVH and NVB of wider opening and its recording in the oscilloscope OSC, the computing module in the oscilloscope determines the number Np of points included in the collecting area ZC located in one of the low and high levels of the eye diagram, for instance the high level NVH.

At step E5, the number Np is then transmitted by the oscilloscope OSC to the measuring unit UM that records it in association with the additional delay T2 introduced by the emulator into a correspondence table. The oscilloscope displays this association as a plotting point in a coordinate reference system on the measuring unit screen.

At step E6, the measuring unit UM compares the number of points Np that has just been determined to the number of points $Np_i$ recorded upon the previous iteration of steps E3 to E8. If $Np_i \geqq Np$, the looking for a maximum number of points Np goes on passing to step E7 wherein the measuring unit checks that the variable delay T2 is not substantially equal to the bit period T. If T2<T, the measuring unit stops the scrambling of the polarization controllers CP1, CP2 and CP3 and increments in absolute value the additional delay value, that is T2=T2+ΔT2, at step E8, in order to look for an enlargement of the eye diagram opening DO and to find a number of points Np even larger. Steps E3 to E6 or E7 are reiterated to restart the scrambling cycle of the scrambling controllers with the incremented additional delay in order to find the T2 value associated with a maximum opening of the displayed eye diagrams.

If Np≅$Np_i$ at step E6, or T2≅T at step E7, the measuring unit UM determines the additional delay $T2_M$ corresponding to the first maximum $Np_M$=$Np_i$ of the number of points found in the correspondence table reflecting the maximum opening of the eye diagrams, at step E9. The unit UM subtracts the additional delay $T2_M$ from the bit period T=1/D to derive the differential group delay T1, at step E9.

Alternatively, the third polarization controller CP3 and the fixed polarizer CF constituting a means for transforming the phase modulation signal $S_{EM}$ into the signal $S_{PF}$, the intensity of which is modulated, are replaced by an orientable polarizer mounted on a motorized cylinder. The rotation axis of the cylinder perpendicular to the polarization plan of the adjustable polarizer is rotated in order to align the polarization state of the orientable polarizer with the selected polarization state B1 or B2 of the signal $S_{EM}$ outgoing from the emulator. In the measuring method, instead of controlling the scrambling mode MdB of the polarization controller CP3, the measuring unit UM controls the rotation of the polarizer.

The measurement of the group delay T1 is quite fast, about a few minutes. Several delays T1 in the connection are repetitively determined according to steps E1 to E9 for plural channels of the connection and during a relatively long period of several hours or days in order to estimate the polarization mode dispersion PDM of the connection LI by averaging the determined delays.

Simultaneously to the measurement of a differential group delay at a given time, the receiver $RX_n$ corresponding to the test channel can collect transmission digital error rate values and thus estimate the running margin concerning the differential group delay of the connection.

The observation of the eye diagram DO on the oscilloscope OSC can be replaced or completed by the observation of the optical spectrum SP of the polarized signal $S_{PF}$ outgoing from the fixed polarizer PF, or the orientable polarizer mounted on a motorized cylinder, by means of high resolution optical spectrum analyzer AS. The spectrum analyzer records the modulation lobes between frequencies $F_n$−kD/2 and $F_n$+kD/2 of the signal $S_{PF}$ with $F_n$=c/$\lambda_n$, c being the light velocity and k being an integer equal or more than 1, for instance lying between 1 and 5.

Figure 6A:
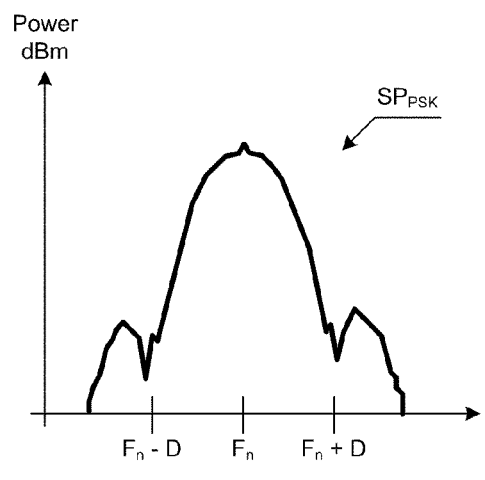
FIGS. 6A and 6B are respectively the optical frequency spectrum of the phase modulated signal entering the optical connection and outgoing from the emulator on each of its orthogonal axes and the optical frequency spectrum of the signal emerging from the optical polarizer, displayed on an optical spectrum analyzer.

When the differential group delay is nil or low with respect to the bit period T of the digital signal ST, the frequency spectrum $SP_{PSK}$ of the resulting signal $S_{EM}$ outgoing from the emulator EM shows a central lobe between the frequencies $F_n$−D and $F_n$+D, as illustrated on FIG. 6A for a signal modulated according to a phase modulation, for instance of the type NRZ-DPSK.

Figure 6B:
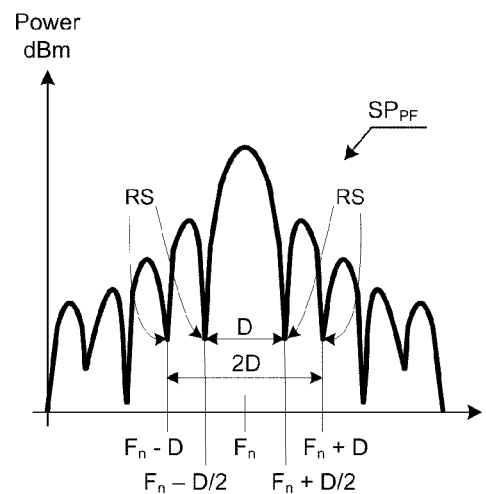

When the measuring unit UM controls the polarization controllers CP1, CP2 and CP3 in scrambling mode MdB by the measuring unit UM and thus the rotation of the polarization controller transmission axes at step E3 and increases step by step the value of the differential group delay T2=T2+ΔT2 displayed in the emulator EM at step E8, the measuring unit looks in the analyzer AS at step E4 for a spectrum $SP_{PF}$ which is closer to that of a direct pulse modulation signal of duo-binary type, as shown on FIG. 6B.

Particularly, the pulse modulated-intensity signal $SP_{PF}$ of duo-binary type is characterized by plural modulation lobes including a central lobe and pairs of symmetric secondary lobes. The central lobe and the first two secondary lobes next to the central lobe have the highest spectrum powers and are thus chosen for characterizing the polarized signal $SP_{PF}$, although at least the central lobe or one of the pairs of secondary lobes is a priori sufficient for characterizing the polarized signal $SP_{PF}$. The central lobe lies between the frequencies $F_n-D/2$ and $F_n+D/2$, has a width D and is centered on the frequency $F_n$. The first two secondary lobes have a width D/2 and extend between the frequencies $F_n-D$ and $F_n-D/2$ and the frequencies $F_n+D/2$ and $F_n+D$. The optical spectrum analysis displays, at step E4, at least the central lobe and the first two secondary lobes so that between the frequencies $F_n-D$ and $F_n+D$ four absorption lines RS are observed at frequencies $F_n-D/2$ and $F_n+D/2$, which corresponds to k=1, and at frequencies $F_n-D$ and $F_n+D$, which corresponds to k=2, delimiting the three previous lobes, as the whole differential group delay T1+T2 tends towards T=1/D. At step E5, the amplitudes of the absorption lines RS at frequencies $F_n-D$, $F_n-D/2$, $F_n+D/2$ and $F_n+D$ are transmitted by the analyzer AS to the measuring unit UM which records them in association with the additional delay T2 introduced by the emulator in the correspondence table. At step E6, the measuring unit UM compares the amplitudes of the absorption lines RS at frequencies $F_n-D$, $F_n-D/2$, $F_n+D/2$ and $F_n+D$ which have just been determined to the amplitudes of the absorption spectrum lines $RS_i$ at frequencies $F_n-D$, $F_n-D/2$, $F_n+D/2$ and $F_n+D$ recorded during the previous iteration of steps E3 to E6. When the four absorption lines reach maximum values at step E6, i.e. if $RS_i(F_n\pm kD/2) RS(F_n\pm kD/2)$ with k equal to 1 or 2, maximums are more finely looked for, by passing by step E7 in order for the measuring unit UM to stop the running polarization controllers CP1, CP2 and CP3 and to increment in absolute value the additional delay value T2 in the emulator, at step E8. Finally, if $RS(F_n\pm kD/2)\cong RS_i(F_n\pm kD/2)$ at step E6 or T2≅T at step E7, the measuring unit UM determines the additional delay $T2_M$ corresponding to the first maximum $R_{SM}(F_n\pm kD/2)=CP_i(F_n\pm kD/2)$ of the amplitudes of encountered spectrum components, at step E9.

As shown on FIG. 2, the measurements and displays by the oscilloscope OSC can be simultaneous to those by the spectrum analyzer AS.

The measuring system according to a preferred embodiment of the invention comprises optoelectronic metrology devices of common use, as polarization controllers, a differential group delay emulator, a digital oscilloscope and/or an optical spectrum analyzer, and also as the transmitters, receivers and other intermediate elements already present at the ends of the optical connection LI and inside it.

A single optical multiplexing channel is used for determining the differential group delay T1 of the connection, the traffic of the other channels being not disturbed by the measurement.

According to a second embodiment, the measuring system SM2 measures the differential group delay of an optical connection constituted by a section of the optical connection LI situated between the connection input MX and a monitoring output of one of the connection elements, such as an optical amplifier AMP and a component OADM, to be connected to the measuring system SM2, as shown in dotted line on FIG. 2. Furthermore, the differential group delay measuring method is indifferently applied on either of the optical channels of the optical connection LI. The measuring system includes, as in the first embodiment, successively a polarization controller CP2, a differential group delay emulator EM, a polarization controller CP3 and a fixed polarizer PF, or an orientable polarizer mounted on a cylinder, an oscilloscope OSC and/or an optical spectrum analyzer AS, and a measuring unit UM. The system SM2 also includes at the input, between the monitoring output of the connection element AMP or OADM and the controller CP2, an optical amplifier linked to a tunable filter. The tunable filter is driven by a selection control transmitted by the measuring unit for selecting the wavelength of one of the multiplexed optical signals in the optical connection LI. The differential group delay measuring method according to the second embodiment is partly similar to the method according to the first embodiment, particularly for steps E2 to E9. At first step of the method, in replacement of the periodic transmission of the test sequence ST by the transmitter $TX_n$ and the activation of the controller CP1 in scrambling mode MdB, the filter is tuned on the selected wavelength by an identifier included in a control transmitted by the measuring unit.

The signal generated at the entrance end of the connection used for measuring the delay T1 is not a test digital signal, but a digital signal containing the real traffic data to be transmitted. Thus, none of the optical channels of the optical connection LI is disturbed by the measurement.

The invention described here relates to method and system for automatically measuring the differential group delay in a section of an optical fiber connection. In a preferred embodiment, the steps in the method of the invention are determined by instructions of a computer program incorporated into a processor of the measuring system. The program includes program instructions which, when said program is executed in the processor, whose operation is then controlled by executing the program, perform the steps in the method.

Consequently, a preferred embodiment of the invention also applies to a computer program, including a computer program stored on or in a storage medium readable by a computer and any data processing device adapted to implement the method. Such a program may be written in any programming language and take the form of source code, object code, or intermediate code between source code and object code, e.g. in a partially compiled form, or any other form suitable for implementing the method.

The storage medium may be any entity or device capable of storing the program. For example, the medium may comprise storage means on which the computer program is stored, such as a ROM, for example a CD-ROM or a microelectronic circuit ROM, or USB key, or magnetic storage means, for example a diskette (floppy disk) or hard disk.

Furthermore, the program may in particular be downloaded over an internet type network.

Alternatively, the storage medium may be an integrated circuit in which the program is incorporated, the circuit being adapted to execute or be used for the execution of the method.

What we claim is:

1. A method of measuring differential group delay in an optical fiber connection conveying an optical signal modulated by a digital signal at a given rate, said method including:

phase modulating the optical signal by said digital signal at an entrance end of said optical fiber connection, rotating a polarization state of said modulated optical signal emerging from said optical fiber connection to provide a non delayed modulated optical signal, introducing an additional delay into said non delayed modulated optical signal to provide a delayed modulated optical signal, combining said delayed modulated optical signal and said non delayed modulated optical signal both polarized along two orthogonal axes into a resulting optical signal, selecting a polarization state in said resulting optical signal along substantially one of bisecting lines of said orthogonal axes into a linearly polarized signal, and determining the differential group delay in said optical fiber connection as a function of a characteristic of said polarized signal, said differential group delay being equal to the difference between the inverse of said given rate and said additional delay.

2. A method according to claim 1, wherein selecting said polarization state includes a rotation of said polarization state of said resulting signal to cause half power of each of orthogonal polarization states of said resulting optical signal along said orthogonal axes to pass through a fixed polarizer.

3. A method according to claim 1, wherein selecting said polarization state includes a rotation of an orientable polarizer for substantially aligning a polarization axis of said orientable polarizer with said one of bisecting lines.

4. A method according to claim 1, wherein determining said differential group delay includes the steps of:

acquiring a two-level eye diagram of said polarized signal corresponding to polarization states and to said additional delay introduced into said non delayed modulated optical signal, maximizing a number of points included in a collecting area of said eye diagram by rotating at least said polarization state of said modulated optical signal emerging from said optical fiber connection, associating said additional delay with the maximized number of points, incrementing said additional delay and reiterating the previous steps until said number of points reaches at least a maximum number, and if said maximum number is reached, determining said differential group delay of said optical fiber connection equal to the difference between the inverse of said given rate and the additional delay associated with said maximum number.

5. A method according to claim 1, wherein determining said differential group delay includes the steps of:

acquiring a spectrum of said polarized signal corresponding to polarization states and to said additional delay introduced into said non delayed modulated optical signal, maximizing the amplitude of spectral absorption lines located at the sum and at the difference between the frequency of said non delayed modulated optical signal and an multiple integer of half said given rate by the rotation of at least said polarization state of said modulated optical signal emerging from said connection, associating said additional delay with said spectral absorption lines having maximized amplitudes, incrementing said additional delay and reiterating the previous steps until said spectral absorption lines have reached maximal amplitudes, and if the maximum amplitudes are reached, determining said differential group delay of said optical fiber connection equal to the difference between the inverse of said given rate and said additional delay associated with said maximal amplitudes.

6. A method according to claim 1, including rotating said polarization state of said modulated optical signal entering said optical connection.

7. A system for measuring differential group delay of an optical fiber connection conveying a modulated optical signal at a given rate, said system including:

means at an entrance end of said optical fiber connection for phase modulating said optical signal by said digital signal, means for rotating a polarization state of said modulated optical signal emerging from said optical fiber connection to provide a non delayed modulated optical signal, means for introducing an additional delay into said non delayed modulated optical signal to provide a delayed modulated optical signal, means for combining said delayed modulated optical signal and said non delayed modulated optical signal both polarized along two orthogonal axes into a resulting optical signal, means for selecting a polarization state in said resulting signal along substantially one of bisecting lines of said orthogonal axes into a linearly polarized signal, and means for determining said differential group delay in the optical fiber connection as a function of a characteristic of said polarized signal, said differential group delay being equal to the difference between the inverse of said given rate and said additional delay.

8. A system according to claim 7, wherein said selecting means includes a fixed polarizer and means for rotating the polarization state of said resulting signal to cause substantially half power of each of orthogonal polarization states of said resulting signal to pass through said fixed polarizer.

9. A system according to claim 7, wherein said selecting means includes an orientable polarizer adapted to rotate in order for a polarization axis of said orientable polarizer to be aligned with one of said bisecting lines.

10. A system according to claim 7, wherein said determining means includes a digital oscilloscope for acquiring a eye diagram of said polarized signal.

11. A system according to claim 7, wherein said determining means includes an optical spectrum analyzer for acquiring a spectrum of said polarized signal.

12. A system according to claim 7, including means at said entrance end of said optical fiber connection for rotating the polarization state of said modulated optical signal.

13. A digital oscilloscope in a system for measuring differential group delay of an optical fiber connection conveying an optical signal modulated by a digital signal at a given rate, including: means for acquiring a two-level eye diagram of a linearly polarized signal provided from a selection of polarization state in a signal resulting from a combination of said optical signal emerging from said optical fiber connection, phase-modulated and non delayed and said phase-modulated optical signal delayed by an additional delay, said non delayed phase-modulated optical signal and delayed phase-modulated optical signal being both polarized along two orthogonal axes, said resulting signal being polarized along substantially one of bisecting lines of said orthogonal axes, means for determining a maximum number of points included in a collecting area of the eye diagram during a rotation at least of the polarization state of said non delayed phase-modulated optical signal emerging from said optical fiber connection, and means for associating said additional delay with the determined maximum number of points.

14. An optical spectrum analyzer in a system for measuring differential group delay of an optical fiber connection conveying a optical signal modulated by a digital signal at a given rate, including:

means for acquiring an optical spectrum of a linearly polarized signal provided from a selection of polarization state in a signal resulting from a combination of said optical signal emerging from said optical fiber connection, phase-modulated and non delayed and said phase-modulated optical signal delayed by an additional delay, said non delayed phase-modulated optical signal and delayed phase-modulated optical signal being both polarized along two orthogonal axes, said resulting signal being polarized along substantially one of bisecting lines of said orthogonal axes, means for determining maximal spectral absorption lines located at the sum and the difference between the frequency of said non delayed phase-modulated optical signal emerging from said optical fiber connection and an multiple integer of half said given rate by a rotation of at least the polarization state of said modulated optical signal emerging from said optical fiber connection, and means for associating said additional delay with said maximal spectral absorption lines.

15. A storage medium readable by a computer on which a computer program including instructions to execute the differential group delay measuring method according to claim 1 is stored.

* * * * *